March 26, 1929.   O. O. FUSCH ET AL   1,706,920
CYLINDER DRAIN VALVE
Filed Nov. 11, 1927

INVENTORS,
Otis O. Fusch,
Peter Hammer,
BY
R. W. Smith
ATTORNEY.

Patented Mar. 26, 1929.

1,706,920

UNITED STATES PATENT OFFICE.

OTIS O. FUSCH AND PETER HAMMER, OF BELLFLOWER, CALIFORNIA.

CYLINDER DRAIN VALVE.

Application filed November 11, 1927. Serial No. 232,512.

This invention is a drain valve adapted for use in connection with any structure in which a fluid is confined for use under pressure, and the invention is particularly applicable for use in connection with a steam engine for draining the cylinders when the steam is shut off.

It is the object of the invention to provide a drain valve which is closed when the working fluid is under pressure and which is automatically opened for draining the fluid whenever the pressure is relieved. In its particular application as a drain valve for a steam engine the invention thus provides for preventing escape of steam when the steam is under pressure for operating the engine, and when the engine is stopped and the pressure in the cylinder thereby relieved, the drain valve is automatically opened to drain the cylinder of any condensation.

It is a further object of the invention to provide an adjustable control for the drain valve whereby it may be set to open whenever the pressure of the confined fluid drops below a predetermined minimum, thereby insuring drainage at any predetermined reduced pressure which is liable to result in condensation.

It is a still further object of the invention to adapt the drain valve for use in connection with a usual steam engine wherein pressure is alternately exerted against a piston from opposite ends of a cylinder, the arrangement being such that the working pressure in each end of the cylinder is checked against reentering the opposite end of the cylinder but remains in open communication with the drain valve for retaining the latter in closed position as long as the predetermined steam pressure is maintained.

The invention will be readily understood from the following description of the accompanying drawings, in which.

Figure 1:
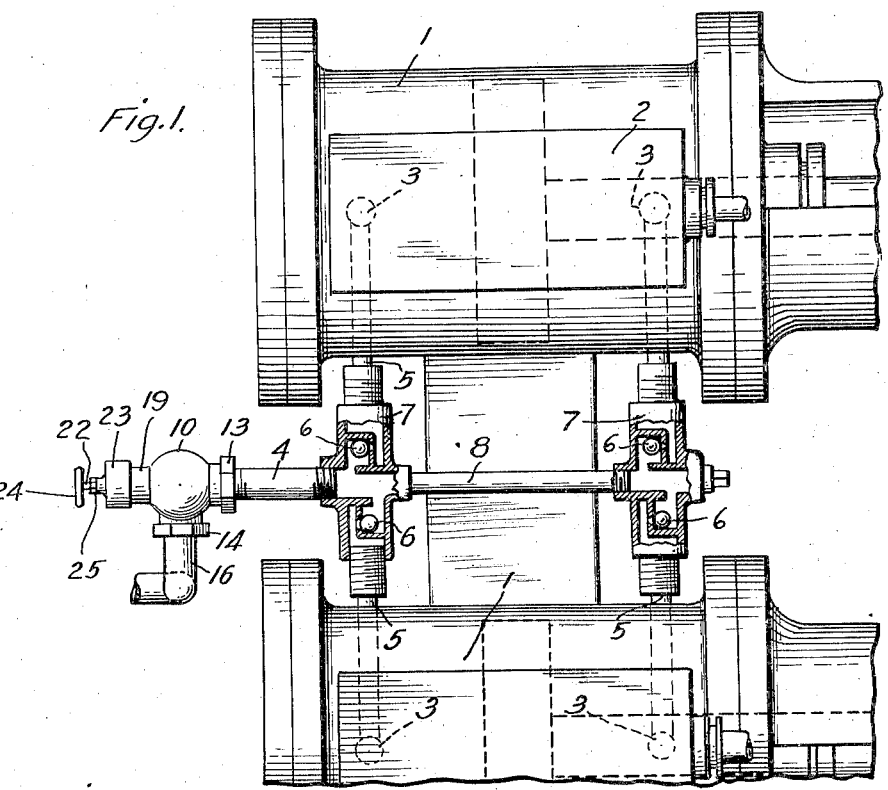
Fig. 1 is a fragmentary top plan view of a usual steam engine provided with the improved drain valve.
Figures 2, 4:
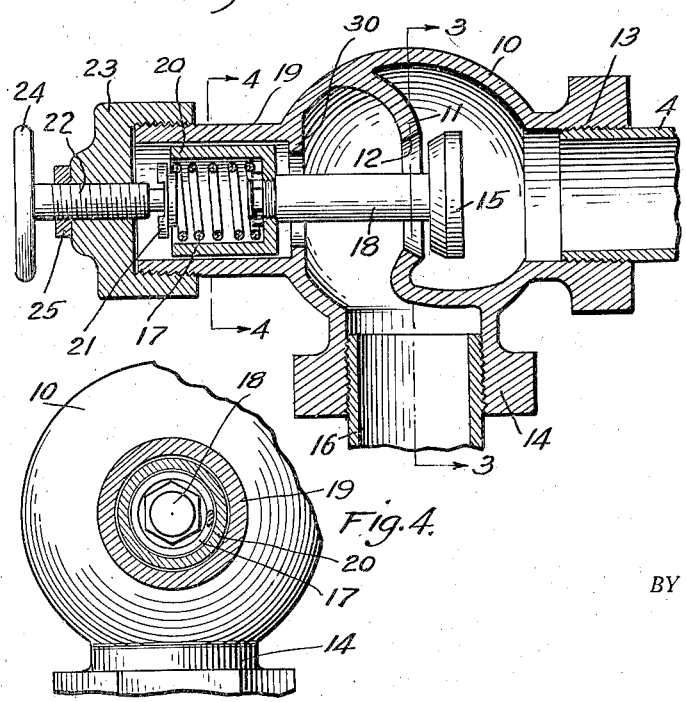
Fig. 2 is an axial section through the drain valve.
Figure 3:
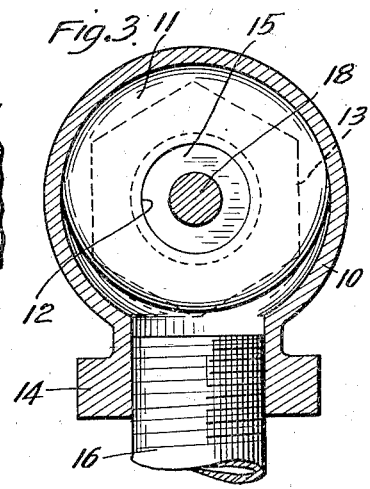

Figs. 3 and 4 are transverse sections on the lines 3—3 and 4—4 of Fig. 2.

While the drain valve is adapted for use in connection with any conduit, cylinder or the like in which a fluid is confined under working pressure, we have illustrated a preferred embodiment of the invention showing its use in connection with a usual duplex steam pump. The pump includes transversely spaced parallel steam cylinders 1, which are provided with steam chests 2 having the usual valve structure for alternately introducing and exhausting steam from the respective cylinder ends. The cylinder ends are provided with usual drain ports 3 for draining off condensation.

The plurality of drain ports 3 communicate with the drain valve so that the working pressure in each cylinder end is effective to close the drain valve and thus retain it in closed position as long as working pressure is supplied to the cylinders, and means are provided whereby the pressure which is supplied to the drain valve from any cylinder end is prevented from reentering any other of the cylinder ends which are at that time exhausting. As an instance of this arrangement the drain valve is supplied with the working pressure from the steam cylinders through a conduit 4, and this conduit communicates with branch conduits 5 which lead to the respective drain ports 3.

A check valve 6 is provided for each of the branch conduits and is arranged so that during the pressure stroke in its corresponding cylinder end each check valve permits flow past the same to conduit 4, but the pressure of such flow closes the other check valves for the cylinder ends which are at that time exhausting. To insure such operation the check valves may be arranged in pairs in the respective ends of couplings 7, and the pairs of branch conduits 5 for the respective ends of the twin cylinders 1 communicate with the respective ends of the couplings 7, with the medial portions of said couplings between their check valves connected by a conduit 8 and the pipe 4 communicating with said medial portion of one of the couplings.

The drain valve which is connected to pipe 4 is closed by pressure in the pipe and is automatically opened whenever the pressure is relieved so that condensation may drain from the steam cylinders. The drain valve comprises a valve casing 10 having an internal partition 11 forming a valve seat 12, with the space at opposite sides of the partition communicating with angularly disposed inlet and outlet ports 13—14 respectively. Pipe 4 is connected to port 13 and a valve 15 cooperates with seat 12 so that pressure entering the valve casing at port 13 tends to seat the valve and thus prevents discharge through the other port 14 which may be connected to a suitable drain pipe 16.

When the pressure in pipe 4 is relieved the valve 15 is automatically shifted in the opposite direction so as to open the valve and thus permit drainage past the valve seat 12 and thence through port 14. For this purpose a spring 17 cooperates with the stem 18 of valve 12, and the valve stem may project from casing 10 through a sleeve 19 in axial alinement with port 13. A collar 20 is fixed on the projecting end of the valve stem with the spring 17 coiled in the collar and abutting against its inner end, and the spring may be held under compression by a follower 21 engaging its outer end.

The follower is preferably adjustable to vary the tension of the spring, and for this purpose is shown as engaged by a screw 22 which is threaded through a cap 23 mounted on sleeve 19. The screw 22 may be adjusted by a hand wheel 24 and may be locked in adjusted position by a lock nut 25. The spring 17 is adjusted so that any predetermined pressure through port 13 will seat the valve 15 against the tension of the spring and thereby prevent drainage through port 14, but reduction of said pressure below a predetermined minimum will cause the spring to open the valve and thereby permit drainage through port 14. Opening movement of the valve may be limited by an internal abutment collar 30 on casing 10 adapted for engagement by the collar 20.

In operation as long as steam pressure is supplied to cylinders 1, the working pressure is transmitted to casing 10 through conduits 4 and 5 and thereby causes spring 17 to yield for closing valve 15 and preventing drainage through port 14, but when the steam supply is shut off and the pressure against valve 15 is consequently relieved, the spring 17 opens the valve and permits condensation to drain from cylinders 1 through pipes 5 and past the open valve 15 and through the discharge port 14. When steam is again supplied to the cylinders, its pressure is again exerted against the valve 15 for reclosing it and shutting off the drainage discharge.

The invention thus provides extremely simple but positive and efficient means for automatically draining steam cylinders to drain off condensation whenever the steam supply is shut off, and while the invention is particularly adapted for use in connection with steam cylinders, it will be readily apparent that it is of general adaptability for draining any structure in which a fluid is confined under pressure, the spring 17 being readily adjustable to automatically open the drain valve when the pressure is reduced below any predetermined minimum.

We claim:

1. A drain valve for the cylinder of an engine which has fluid pressure expansion chambers in its respective ends, said drain valve comprising a valve casing having an inlet and an outlet, conduits between each of said cylinder ends and said inlet, check valves in said conduits, each of said check valves being adapted to open for flow from its corresponding cylinder end to the inlet and adapted to be closed by the pressure of the flow from the opposite cylinder end, a valve in the valve casing between the inlet and the outlet, said valve being adapted to close responsive to pressure through said inlet, and means for automatically opening the valve upon relief of said pressure.

2. A common drain valve for a plurality of means adapted to confine fluid which is alternately at working pressure in the respective confining means, said drain valve comprising a valve casing having an inlet and an outlet, conduits between each of said confining means and said inlet, check valves in said conduits, each of said check valves being adapted to open for flow from its corresponding confining means to the inlet and adapted to be closed by the pressure of the flow from any other of said confining means, a valve in the valve casing between the inlet and the outlet, said valve being adapted to close responsive to pressure through said inlet, and means for automatically opening the valve upon relief of said pressure.

3. A common drain valve for a plurality of expansion chambers of an engine in which fluid is alternately at working pressure, said drain valve comprising a valve casing having an inlet and an outlet, conduits between each of said expansion chambers and said inlet, check valves in said conduits, each of said check valves being adapted to open for flow from its corresponding expansion chamber to the inlet and adapted to be closed by the pressure of the flow from any other of said expansion chambers, a valve in the valve casing between the inlet and the outlet, said valve being adapted to close responsive to pressure through said inlet, and means for automatically opening the valve upon relief of said pressure.

4. A common drain valve for a plurality of means adapted to respectively confine fluid under pressure, said drain valve comprising a valve casing having an inlet and an outlet, conduits between each of said confining means and said inlet, check valves in said conduits, each of said check valves being adapted to open for flow from its corresponding confining means to the inlet and adapted to be closed by the pressure of the flow from any other of said confining means, a valve in the valve casing between the inlet and the outlet, said valve being adapted to close responsive to pressure through said inlet, and means for automatically opening the valve upon relief of said pressure.

In testimony whereof they have affixed their signatures to this specification.

OTIS O. FUSCH.
PETER HAMMER.